United States Patent [19]
Toba

[11] Patent Number: 6,144,405
[45] Date of Patent: *Nov. 7, 2000

[54] ELECTRONIC PICTURE STABILIZER WITH MOVABLE DETECTION AREAS AND VIDEO CAMERA UTILIZING THE SAME

[75] Inventor: Akira Toba, Hirano-ku, Japan

[73] Assignee: Sanyo Electric Company, Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/573,382

[22] Filed: Dec. 15, 1995

[30] Foreign Application Priority Data

Dec. 16, 1994 [JP] Japan ................................ 6-312804

[51] Int. Cl.$^7$ ............................ H04N 5/14; H04N 5/228; H04N 7/18
[52] U.S. Cl. ......................... 348/208; 348/155; 348/699; 396/55
[58] Field of Search ...................... 348/135, 142, 348/155, 169, 208, 699, 700, 701; 396/52, 55; H04N 7/18, 9/47, 5/225, 5/228

[56] References Cited

U.S. PATENT DOCUMENTS

| | | | |
|---|---|---|---|
| 4,992,869 | 2/1991 | Samad et al. | 358/140 |
| 5,138,445 | 8/1992 | Ueda | 348/208 |
| 5,210,559 | 5/1993 | Ohki | 396/55 |
| 5,237,405 | 8/1993 | Egusa et al. | 358/105 |
| 5,349,415 | 9/1994 | Nishida | 354/432 |
| 5,371,539 | 12/1994 | Okino et al. | 348/207 |
| 5,563,652 | 10/1996 | Toba et al. | 348/208 |

FOREIGN PATENT DOCUMENTS 0 458 239 A2  11/1991  European Pat. Off. .
0 541 092 A2  5/1993   European Pat. Off. .

OTHER PUBLICATIONS

8012 SMPTE Journal 101 (1992) Feb., No. 2, White Plains, NY, US titled "Electronic Image Stabilization System for Video Cameras and VCRs".

European Search Report dated Mar. 18, 1996, Reference No. g–FP–0816, Application No. 95119838.1 citing above listed references.

*Primary Examiner*—Wendy Garber
*Assistant Examiner*—Ngoc-Yen Vu
*Attorney, Agent, or Firm*—Armstrong, Westerman, Hattori, McLeland, & Naughton

[57] ABSTRACT

An electronic picture stabilizer includes a microcomputer which determines whether or not each of detection areas is a valid area or invalid area. If the detection areas adjacent in a vertical direction are invalid areas, the detection areas are moved so as to maximize a distance between the detection areas adjacent in the vertical direction, and if the detection areas adjacent in a horizontal direction are invalid areas, the detection areas are moved in a manner that a distance between the detection areas adjacent in the horizontal direction becomes maximum. If the number of the invalid areas is a predetermined value, the detection areas are moved at four (4) corners of an image field. By moving the detection areas, the invalid areas become valid areas. If all the detection areas continuously become the valid areas during a predetermined number of fields, the detection areas are returned to their initial positions.

23 Claims, 14 Drawing Sheets

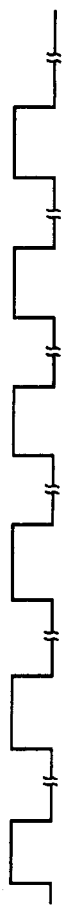
FIG.5(A) HD
FIG.5(B) HORIZONTAL ADDRESS
FIG.5(C) OUTPUT OF H. DECODER (AT HR 1)
FIG.5(D) OUTPUT OF H. TIMING COUNTER
FIG.5(E) OUTPUT OF H. TIMING DECODER

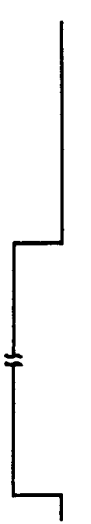
FIG.10(A) DETERMINATION OF DETECTION POSITION HD
FIG.10(B) H. ADDRESS
FIG.10(C) OUTPUT OF H. DECODER (AT HK 1)
FIG.10(D) OUTPUT OF H. TIMING COUNTER
FIG.10(E) OUTPUT OF H. TIMING DECODER (PULSE FOR PERIOD OF 192 PIXELS)

MOTION VECTOR OF MOVING OBJECT

IMAGE FIELD

MOTION VECTOR OF MOVING OBJECT

ELECTRONIC PICTURE STABILIZER WITH MOVABLE DETECTION AREAS AND VIDEO CAMERA UTILIZING THE SAME

BACKGROUND OF THE INVENTION

1. Field of the Invention

The present invention relates to an electronic picture stabilizer and a video camera utilizing the same. More specifically, the present invention relates to an electronic picture stabilizer which is utilized in a consumer-purpose camcorder, and a video camera utilizing such a picture stabilizer.

2. Description of the Prior Art

In the past, in order to correct an unintentional motion component of an image sensing device, a method utilizing a portion motion vector obtained for each detection area according to a representative point matching method is proposed. As a prior art in which an electronic picture stabilization is performed with utilizing such a portion motion vector, the same assignee of the present invention has proposed one method disclosed in Japanese Patent Application Laying-open No. 7(1995)-38800. In this prior art, a minimum correlation value, a mean correlation value and position data are evaluated by a calculation circuit for each of detection areas, and applied to a microcomputer which evaluates a portion motion vector on the basis of the position data of a pixel indicating the minimum correlation value.

Furthermore, the microcomputer detects on the basis of the mean correlation value and the minimum correlation value whether the portion motion vector of the detection area is due to the unintentional motion or otherwise so as to determine whether the detection area is a valid area or invalid area.

Furthermore, a whole motion vector is detected by the microcomputer according to methods which are different from each other in accordance with the number of the valid areas out of all the detection areas, and the unintentional motion is corrected on the basis of the whole motion vector.

For example, as shown in FIG. 17, by cutting a portion of an image out and moving a cut-out position according to the whole motion vector, the unintentional motion is corrected.

However, in the above described prior art, if a moving object passed through the detection area, not only the valid areas but also invalid areas are detected. In such a case, a whole motion vector is affected by the invalid area, and therefore, there is a possibility that an operation of the picture stabilization or the correction of the unintentional motion is crippled. More specifically, when the moving object enters into a plurality of detection areas as shown in FIG. 18, for example, the detection areas A and C become invalid areas, and therefore, the number of the valid areas is decreased, and accordingly, a reliability of the whole motion vector becomes low, and therefore, there is a possibility that an accuracy of the picture stabilization becomes bad.

SUMMARY OF THE INVENTION

Therefore, a principal object of the present invention is to provide an electronic picture stabilizer capable of performing a picture stabilization with higher accuracy, and a video camera utilizing such an electronic picture stabilizer.

An electronic picture stabilizer according to the invention comprises; a means for detecting a portion motion vector for each of a plurality of detection areas arranged within an image field; a means for evaluating a whole motion vector on the basis of the portion motion vectors of the detection areas; and a moving means for moving the detection area according to a situation for taking a picture.

In the present invention, the detection areas are moved by the moving means according to the situation.

For example, if it is determined that the detection areas adjacent in a vertical direction are invalid areas by an area determination means, the detection areas are moved by the moving means in a manner that a distance between the adjacent detection areas becomes maximum. If it is determined that the detection areas adjacent in a horizontal direction are invalid areas by the area determination means, the moving means moves the detection areas such that a distance between the adjacent detection areas are maximized. Furthermore, if a predetermined number of the invalid areas are detected by the area determination means, the detection areas are moved by the moving means in a manner that not only the distance between the detection areas adjacent in the vertical direction becomes maximum but also the distance between the detection areas adjacent in the horizontal direction becomes maximum. Thus, by moving the detection areas in a manner that the distance between the adjacent detection areas becomes maximum, it is possible to make the invalid areas be valid areas.

Furthermore, if all the detection areas become the valid areas, the detection areas are returned to initial positions of the detection areas.

In addition, such an electronic picture stabilizer can be utilized in a video camera.

In accordance with the present invention, since the invalid area can be made as a valid area by moving the detection areas by the moving means, it is possible to prevent the whole motion vector from being affected by the invalid area. Therefore, it is possible to detect the whole motion vector, i.e. an unintentional motion amount more correctly, and accordingly, it is possible to perform an electronic picture stabilization with higher accuracy.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a timing chart showing a processing for determining a position of a representative point of a detection area A;

FIG. 10 is a timing chart showing a processing for determining a detection position of the detection area A;

DETAILED DESCRIPTION OF THE PREFERRED EMBODIMENT

Figure 1:
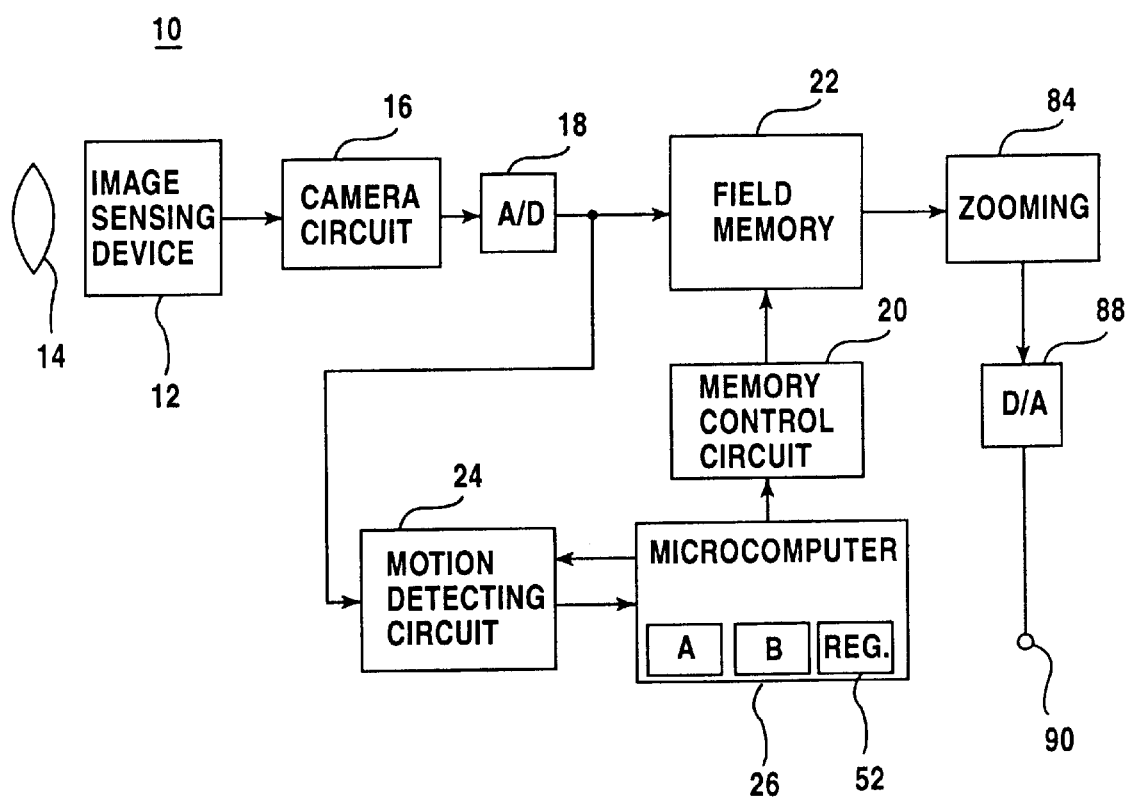
FIG. 1 is a block diagram showing one embodiment according to the present invention.

A video camera 10 of this embodiment shown in FIG. 1 includes a solid-state image sensing device 12 such as a CCD (Charge-Coupled Device) which converts an optical signal being inputted from an object (not shown) through a lens 14 into an electric signal. The electric signal from the solid-state image sensing device 12 is inputted to a camera circuit 16. As well known, the camera circuit 16 includes a sample-hold circuit by which the electric signal from the solid-state image sensing device 12 is sampled and held. A level of the electric signal thus sampled, and held is adjusted by an AGC (Automatic Gain Control), and synchronization signals are added to the electric signal by a synchronization signal adding circuit (not shown). Thus, the camera circuit 16 converts the electric signal from the solid-state image sensing device 12 into an analog video signal. The analog video signal is further converted into a digital video signal by an A/D converter 18. The digital video signal is written in a field memory 22 field by field under control of a memory control circuit 20. Furthermore, the digital video signal is applied to a motion detecting circuit 24. In addition, the memory control circuit 20 and the motion detecting circuit 24 are constructed by the same LSI, and LSI "L7A0948" manufactured by Sanyo Electric Co., Ltd. may be utilized for example.

Figure 3:
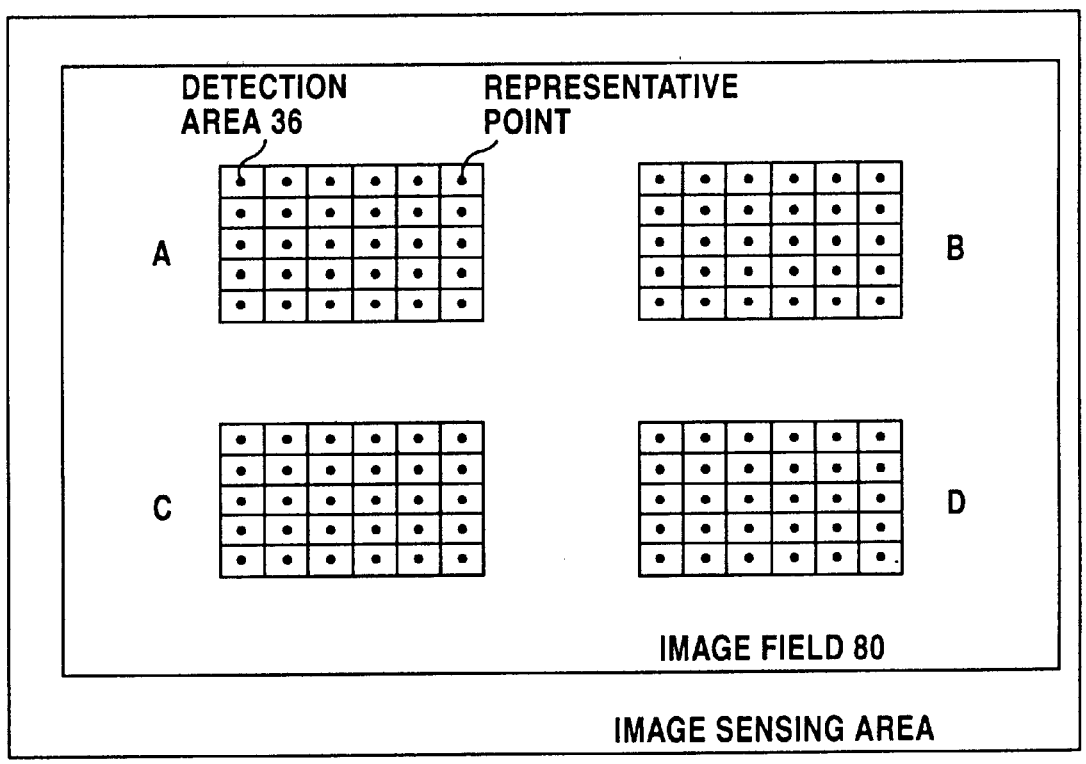
FIG. 3 is an illustrative view showing a principle of an electronic zooming operation and detection areas within an image field.

The motion detecting circuit 24 evaluates, for each of four (4) detection area A, B, C and D shown in FIG. 3, a position of a point having a highest correlation degree (a minimum correlation value) and four (4) points around the point, and correlation values with utilizing a well-known representative point matching method. The position data and the correlation values from the motion detecting circuit 24 are applied to a microcomputer 26. The microcomputer 26 include an A counter which counts the number of the fields wherein a condition (1) (described later) is continuously satisfied, a B counter which counts the number of the fields wherein the condition (1) is continuously not satisfied, and a register 52 (described later). In addition, in this embodiment shown, sizes of the detection areas A to D are set to be equal to each other.

Figure 2:
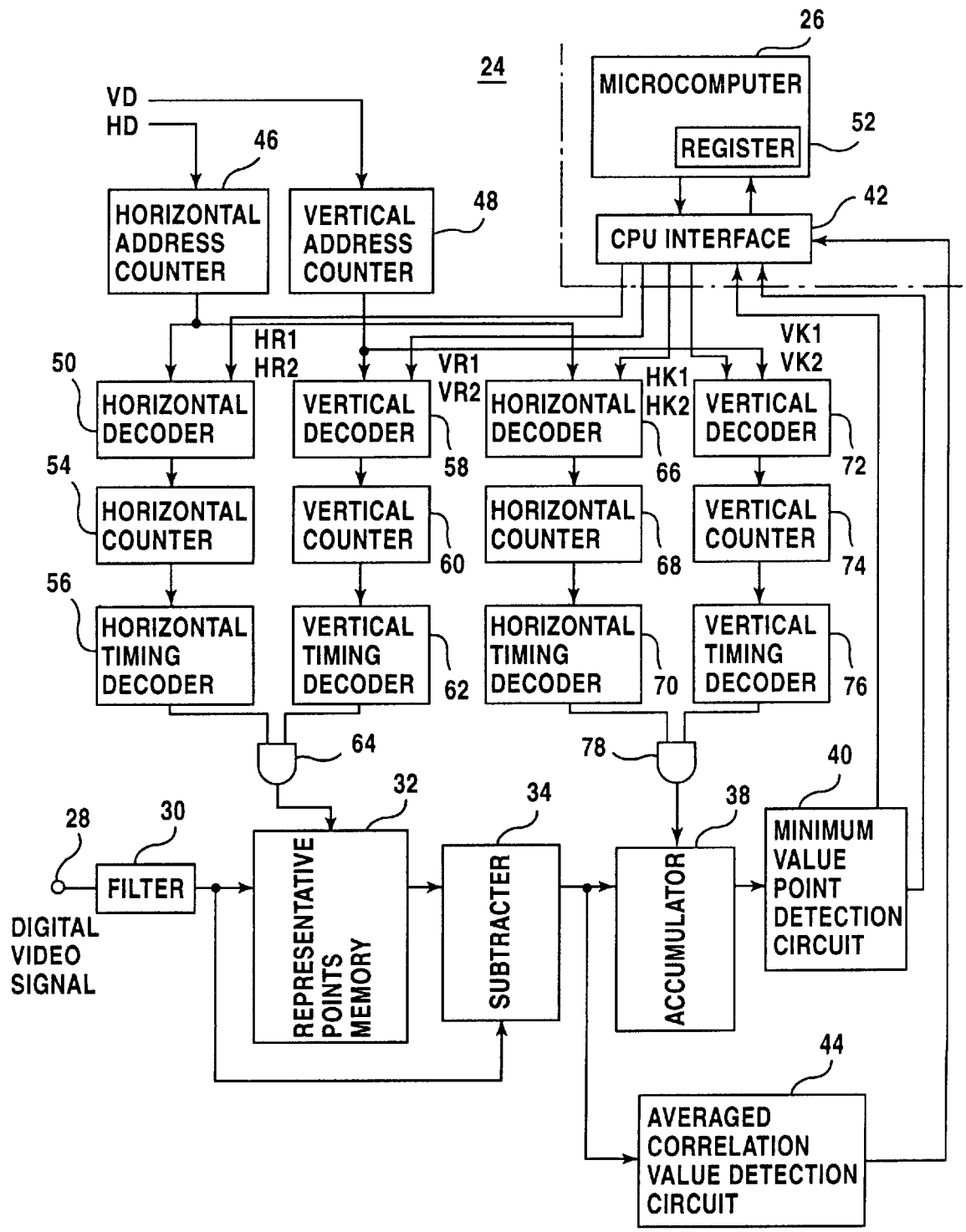
FIG. 2 is a block diagram showing one example of a motion detecting circuit.

The motion detecting circuit 24 is constructed as shown in FIG. 2, for example.

Figure 4:
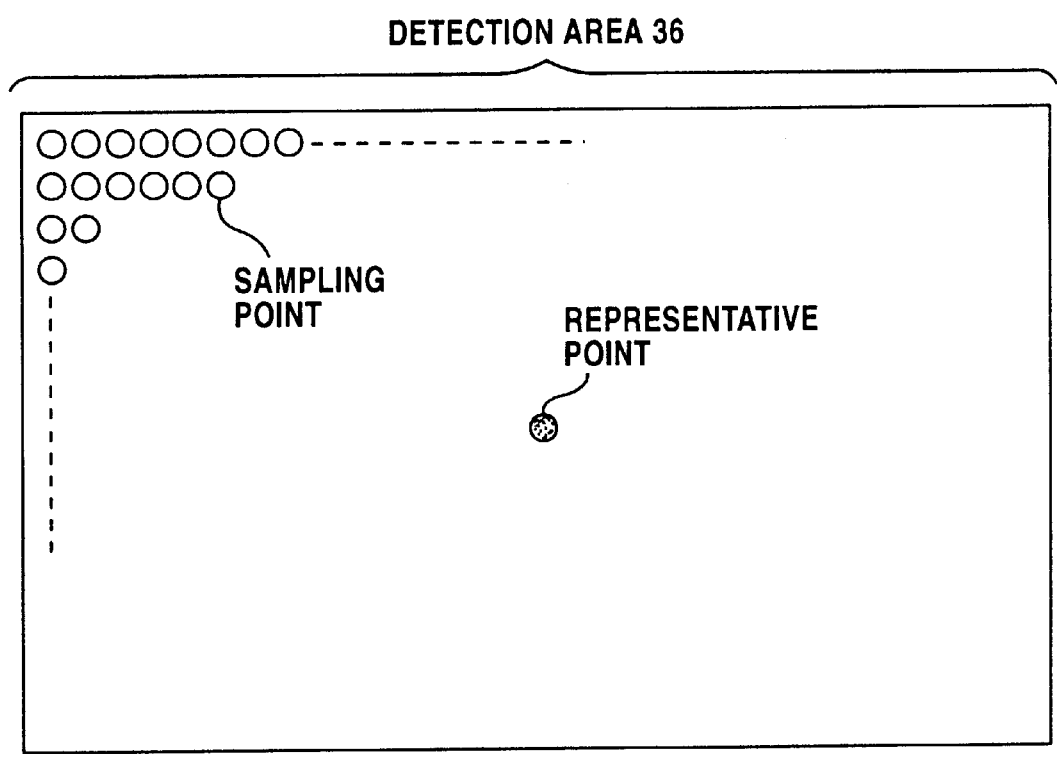
FIG. 4 is an illustrative view showing a principle of the electronic zooming operation and representative points and sampling points in the detection area.

The motion detecting circuit 24 includes an input end 28 which receives the digital video signal from the A/D converter 18. The digital video signal inputted to the input end 28 is applied to a representative points memory 32 and a subtracter 34 through a filter 30. The filter 30 is a kind of digital low-pass filter which is utilized for improvement of an S/N ratio so as to secure a significant detection accuracy with a lesser number of representative points. The representative points memory 32 stores position data and luminance data of a plurality of representative points within the detection areas A to D shown in FIG. 3. In this embodiment shown, each of the detection areas is divided into thirty (30) regions, and therefore, thirty (30) representative points are determined, and accordingly, the representative points memory 32 stores the position data and the luminance data of the thirty (30) representative points. As shown in FIG. 4, each of the divided regions 36 is constituted by 32 pixels in a horizontal direction and 16 pixels in a vertical direction.

The subtracter 34 executes subtraction operations of the luminance data of the representative points of the last field being read-out the representative points memory 32 and the luminance data of all the pixels of the present field being applied from the input end 28, and obtains absolute values of the subtraction results. More specifically, the subtracter 34 evaluates, for each of the pixels, a luminance difference between the luminance data of the present field and the luminance data of the last field, and applies the luminance differences to the accumulator 38. The accumulator 38 executes accumulation and addition of the luminance differences of thirty (30) (in this embodiment shown) so as to obtain correlation values, and outputs the correlation values which are then applied to a minimum value point detection circuit 40.

The minimum value point detection circuit 40 detects a minimum correlation value and position data thereof on the basis of applied correlation values for each of the detection areas A to D. Then, the position data and the correlation values of a pixel indicative of the minimum correlation value and four (4) points around the pixel are applied to the microcomputer 26 via a CPU interface 42. Furthermore, the luminance differences evaluated by the subtracter 34 are applied to a mean correlation value detection circuit 44 in which a mean correlation value is evaluated for each of the detection areas A to D. The mean correlation values are applied to the microcomputer 26 via the CPU interface 42.

Now, in the representative points memory 32 and the accumulator 38, the processings are performed according to the following timings.

First, the processing timing in the representative points memory 32 will be described.

A horizontal address counter 46 and a vertical address counter 48 included in the motion detecting circuit 24 are respectively reset by an HD (horizontal synchronization signal) and a VD (vertical synchronization signal) which are inputted from an outside, and outputs of the horizontal address counter 46 and the vertical address counter 48 become a horizontal address and a vertical address, respectively. The output from the horizontal address counter 46 is applied to a horizontal decoder 50. On the other hand, a value set in the register 52 by the microcomputer 26 (hereinafter, simply called as "register setting value") is applied to the horizontal decoder 50 via the CPU interface 42.

In the horizontal decoder 50, a pulse is outputted to a horizontal timing counter 54 when the horizontal address and the register setting value are coincident with each other. In response to the pulse, the horizontal timing counter 54 is applied to a horizontal timing decoder 56 which decodes a fixed value of the output from the counter 54.

Now, respective register setting values become as shown in the following table 1.

TABLE 1

|  | Equal Arrangement | Maximum Vertical Distance | Maximum Horizontal Distance | Maximum Vertical & Horizontal Distances |
| --- | --- | --- | --- | --- |
| HR1 | 261 | 261 | 151 | 151 |
| HR2 | 616 | 616 | 726 | 726 |
| HK1 | 245 | 245 | 135 | 135 |
| HK2 | 600 | 600 | 710 | 710 |
| VR1 | 44 | 20 | 44 | 20 |
| VR2 | 128 | 152 | 128 | 152 |
| VK1 | 36 | 12 | 36 | 12 |
| VK2 | 120 | 144 | 120 | 144 |

In addition, HR1 and HR2 are register setting values to be applied to the horizontal decoder 50, and VR1 and VR2 are register setting values to be applied to the vertical decoder 58. HK1 and HK2 are register setting values applied to the horizontal decoder 66, and VK1 and VK2 are register setting values applied to the vertical decoder 72. As indicated in the above described table 1, the register setting values applied to the horizontal decoders 50 and 60, and the vertical decoders 58 and 72, respectively are changed in accordance with a position of the invalid area and etc.

With referring to FIG. 5 and FIG. 6, determination of a position of the representative point of the detection area A will be described. In addition, FIG. 6 shows a state where the detection areas A to D are arranged with equal intervals, which being initial positions of the detection areas A to D.

Figure 6:
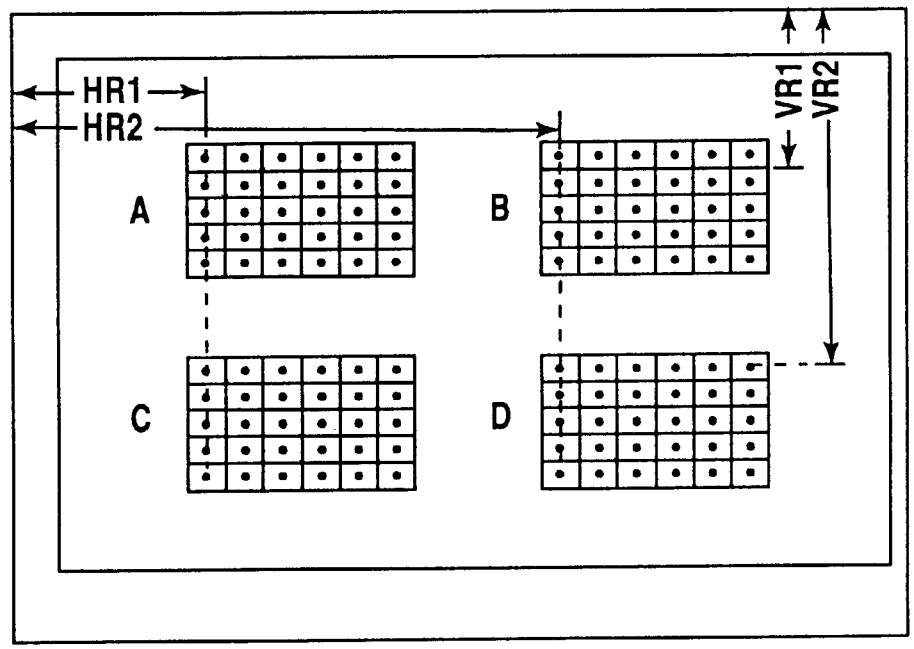
FIG. 6 is an illustrative view showing initial positions of the detection areas and the representative points thereof.

First, when the HD shown in FIG. 5(A) is outputted, the output of the horizontal address counter 46 becomes as shown in FIG. 5(B), and if the register setting value HR1 is "261" (HR1=261) as shown in FIG. 6 and the table 1, a pulse shown in FIG. 5(C) is generated by the horizontal decoder 50. In response thereto, the output shown in FIG. 5(D) is generated by the horizontal timing counter 54, and on the basis of the output, an output shown in FIG. 5(E) is generated by the horizontal timing decoder 56 such that the representative points can be sampled.

The above is the description of the horizontal timing, but the vertical timing is processed in a similar manner.

As to the vertical timing, the output from the vertical address counter 48 and the register setting value in the microcomputer 26 are applied to the vertical decoder 58, and in a manner similar to a case of the above described horizontal timing, the processing is performed by the vertical timing counter 60 and the vertical timing decoder 62. In addition, the register setting value is set as VR1=44.

Then, outputs from the horizontal timing decoder 56 and the vertical timing decoder 62 are applied to an AND gate 64, and a logical product of the outputs is utilized as a write enable of the representative points memory 32.

Thus, since the horizontal timing counter 54 and the vertical timing counter 60 are operated by the register setting values, and the fixed values of the counter outputs are decoded, the write enable applied to the representative points memory 32 can be changed on the basis of the register setting values.

With referring to FIG. 6, the register setting values for the detection areas B, C and D are set as follows:

In the detecting area B, HR2=616 and VR1=44 are set, and in the detection area C, HR1=261 and VR1=128 are set, and in the detection area D, HR2=616 and VR2=128 are set.

Figure 7:
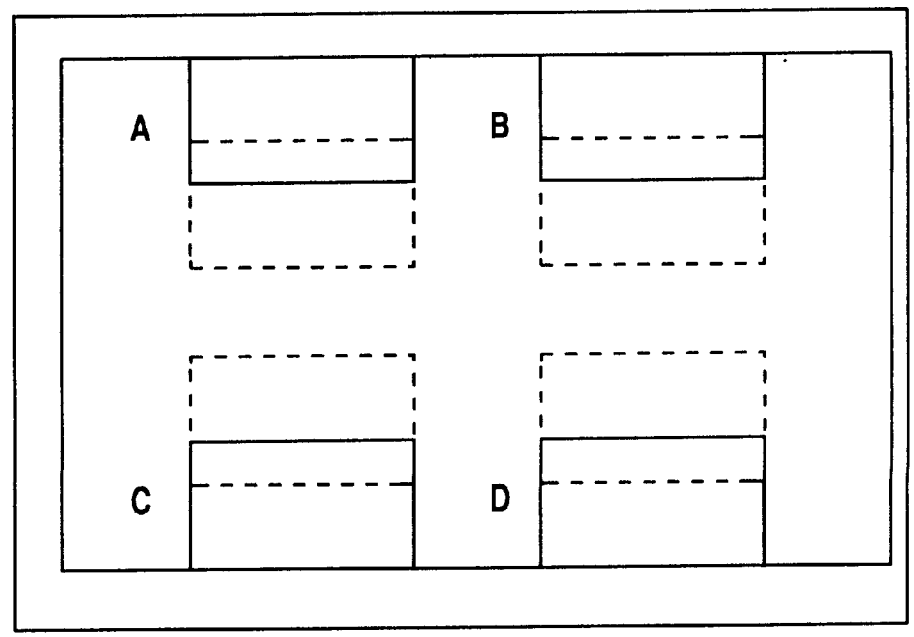
FIG. 7 is an illustrative view showing a state where the detection areas are moved in a manner that a distance between the detection areas adjacent in a vertical direction becomes maximum.

Next, if the detection areas A to D are moved in a manner that a distance between the detection areas adjacent in the vertical direction becomes maximum as shown in FIG. 7, the register setting values for the detection areas A to D become as follows:

In the detection area A, HR1=161 and VR1=20 are set, and in the detection area B, HR2=616 and VR1=20 are set, and in the detection area C, HR1=261 and VR2=152 are set, and in the detection area D, HR2=616 and VR2=152 are set.

Figure 8:
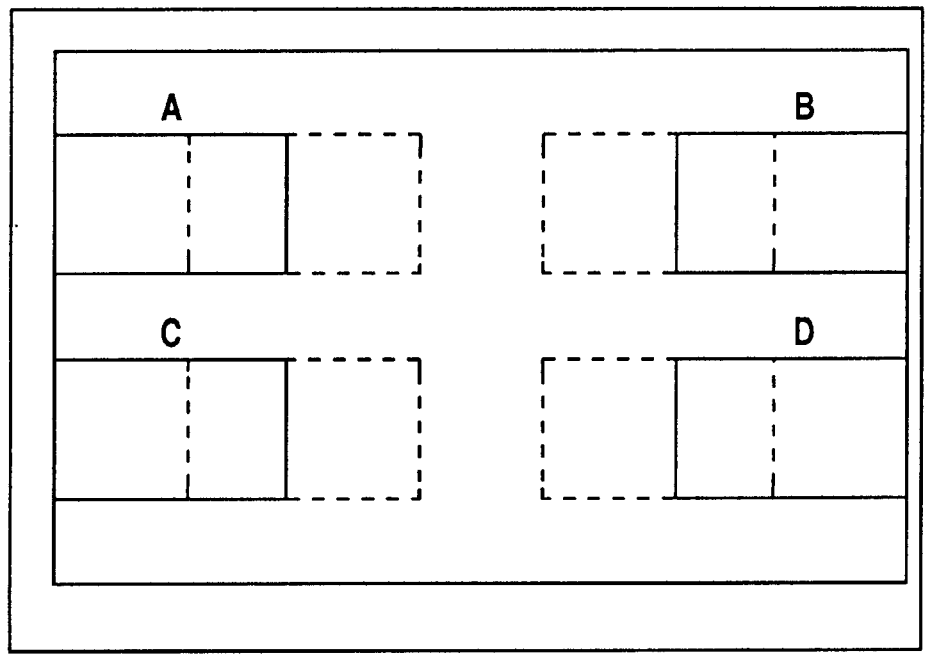
FIG. 8 is an illustrative view showing a state where the detection areas are moved in a manner that a distance between the detection areas adjacent in a horizontal direction becomes maximum.

Furthermore, as shown in FIG. 8, when the detection areas A to D are moved in a manner that the distance between the detection areas adjacent in the horizontal direction becomes maximum, the register setting values for the detection areas A to D are set as follows:

In the detection area A, HR1=151 and VR1=44 are set, and in the detection area B, HR2=726 and VR1=44 are set, and in the detection area C, HR1=151 and VR2=128 are set, and in the detection area D, HR2=726 and VR2=128 are set.

Figure 9:
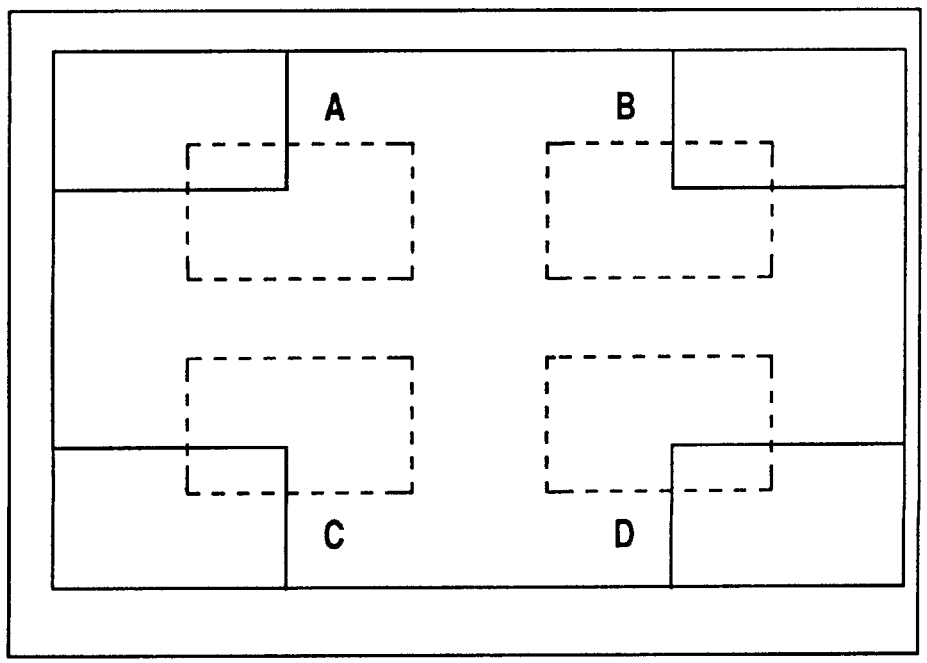
FIG. 9 is an illustrative view showing a state where the detection areas are moved in a manner that not only the distance between the detection areas adjacent in the vertical direction becomes maximum but also the distance between the detection areas adjacent in the horizontal direction becomes maximum.

Furthermore, as shown in FIG. 9, when the detection areas A to D are moved in a manner that the distance between the detection areas adjacent in the horizontal direction becomes maximum and the distance between the detection area adjacent in the vertical direction becomes maximum, the register setting values for the detection areas A to D are set as follows:

In the detection area A, HR1=151 and VR1=20 are set, and in the detection area B, HR2=726 and VR1=20 are set, and in the detection area C, HR1=151 and VR2=152 are set, and in the detection area D, HR2=726 and VR2=152 are set.

Thus, the positions of the representative points are determined by the register setting values VR1, VR2, HR1 and HR2.

Next, the processing timing in the accumulator 38 will be described.

The processing timing in the accumulator 38 is similar to the above described processing timing in the representative points memory 32. That is, the accumulating timing in the accumulator 38, i.e. the positions of the detection areas are set by the horizontal decoder 66, horizontal timing counter 68, horizontal timing decoder 70, vertical decoder 72, vertical timing counter 74, and vertical timing decoder 76, and an AND gate 78.

With referring to FIG. 10 and FIG. 11, the determination of the position of the detection area A will be described. In addition, as similar to FIG. 6, FIG. 11 shows a state where the detection areas A to D are arranged with equal intervals.

Figure 11:
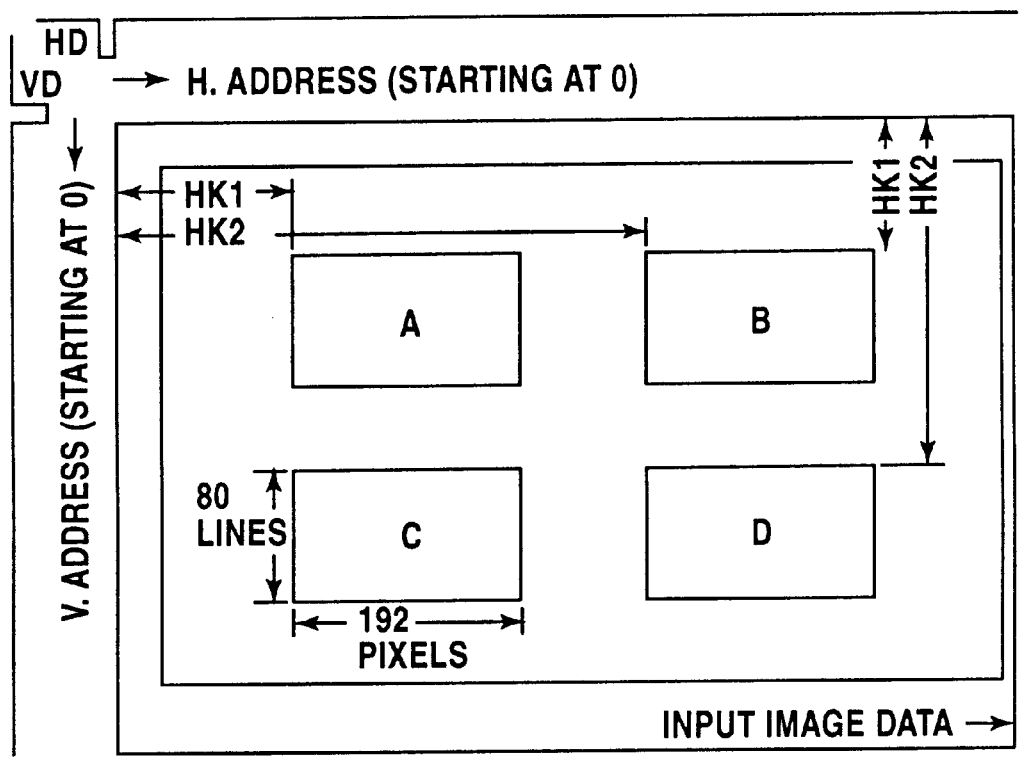
FIG. 11 is an illustrative view showing initial positions of the detection areas.

First, when the HD shown in FIG. 10(A) is outputted, the output of the horizontal address counter 46 becomes as shown in FIG. 10(B), and if the register setting value HK1 is "245" (HK1=245) as shown in FIG. 11 and the table 1, a pulse shown in FIG. 10(C) is generated by the horizontal decoder 66. In response thereto, the output shown in FIG. 10(D) is generated by the horizontal timing counter 68, and on the basis of the output, an output in FIG. 10(E) is generated by the horizontal timing decoder 70 such that all the points can be sampled.

The above is the description of the horizontal timing, but the vertical timing is processed in a similar manner.

As to the vertical timing, the output from the vertical address counter 48 and the register setting value in the microcomputer 26 are applied to the vertical decoder 72, and in a manner similar to a case of the above described horizontal timing, the processing is performed by the vertical timing counter 74 and the vertical timing decoder 76. In addition, the register setting value is set as VK1=36.

With referring to FIG. 11, the register setting values for the detection areas B, C and D are set as follows:

In the detecting area B, HK2=200 and VK1=36 are set, and in the detection area C, HK1=245 and VK1=120 are set, and in the detection area D, HK2=600 and VK2=120 are set.

The accumulating timing in the accumulator 38, i.e. the position of the detection area can be set by the register setting values thus applied.

Next, if the detection areas A to D are moved in a manner that a distance between the detection areas adjacent in the vertical direction becomes maximum as shown in FIG. 7, the register setting values for the detection areas A to D become as follows:

In the detection area A, HK1=245 and VK1=12 are set, and in the detection area B, HK2=600 and VK1=12 are set, and in the detection area C, HK1=245 and VK2=144 are set, and in the detection area D, HK2=600 and VK2=144 are set.

Furthermore, as shown in FIG. 8, when the detection areas A to D are moved in a manner that the distance between the detection areas adjacent in the horizontal direction becomes maximum, the register setting values for the detection areas A to D are set as follows:

In the detection area A, HK1=135 and VK1=36 are set, and in the detection area B, HK2=710 and VK1=36 are set, and in the detection area C, HK1=135 and VK2=120 are set, and in the detection area D, HK2=710 and VK2=120 are set.

Furthermore, as shown in FIG. 9, when the detection areas A to D are moved in a manner that the distance between the detection areas adjacent in the horizontal direction becomes maximum and the distance between the detection areas adjacent in the vertical direction becomes maximum, the register setting values for the detection areas A to D are set as follows:

In the detection area A, HK1=135 and VK1=12 are set, and in the detection area B, HK2=710 and VK1=12 are set, and in the detection area C, HK1=135 and VK2=144 are set, and in the detection area D, HK2=710 and VK2=144 are set.

Thus, the positions of the representative points are determined by the register setting values VK1, VK2, HK1 and HK2.

That is, by changing the register setting values, the positions of the detection areas A to D and the positions of the representative points thereof can be moved arbitrarily.

Returning back to FIG. 1, the microcomputer 26 calculates a motion vector of a whole of a screen, i.e. an image field 80 (FIG. 3) (hereinafter, simply called as "whole motion vector") on the basis of the position data and the correlation values.

First, on the basis of the position data of the pixel indicative of the minimum correlation value, and deviation of the pixel indicative of the minimum correlation value with respect to the representative point, and the deviation is made as a portion motion vector. In addition, in order to make the detection accuracy of the portion motion vector good, the microcomputer 26 performs interpolation with utilizing the correlation values of the four (4) pixels each having the minimum correlation value, and calculates again the position data of the pixel having the minimum correlation value.

Then, the microcomputer 26 detects whether or not a value obtained by dividing the mean correlation value by the minimum correlation value is larger than a predetermined threshold value for each of the detection areas A to D, and determine whether or not portion motion vectors from the detection areas A to D are not erroneously detected due to the moving object other than the unintentional motion and thus effective for judging the unintentional motion. That is, the microcomputer 26 determines whether or not the detection areas A to D are valid areas. If the value obtained by dividing the mean correlation value by the minimum correlation value is larger than the predetermined threshold value, the detection area is determined as the valid area. Specifically, the determination of the valid area is as follows:

When the moving object exists within the detection area, a correlation value of a portion occupied by the moving object and a correlation value of a portion not occupied by the moving object are different from each other, and the portion occupied by the moving object indicates a various kinds of correlation value, and in general, the correlation value becomes a large value (the degree of correlation becomes low). Therefore, when the moving object exists within the detection area, there is much possibility that the minimum correlation value becomes large, and therefore, the reliability that the portion motion vector of the detection area is due to the unintentional motion becomes low. Accordingly, if such a portion motion vector is utilized, the whole motion vector may be erroneously detected. However, when the means correlation value is large, even if the minimum correlation value is large at some extent, the reliability of the portion motion vector is high. On the other hand, when the mean correlation value is small, the reliability of the portion motion vector is small even if the minimum correlation value is smaller. Therefore, in this embodiment shown, the detection area is determined as the valid area at a time that a condition (1) of (mean correlation value)/(minimum correlation value)>threshold value a ("7", for example) is satisfied in the detection area. Then, in order to prevent of an erroneous operation in the picture stabilization, the portion motion vector of the detection area in which the condition (1) is not satisfied is not used for calculating the whole motion vector.

Then, with utilizing the portion motion vectors of the valid areas, a moving amount between a present field and a proceeding field, i.e. the whole motion vector is calculated. The whole motion vector represents the motion amount between the fields and a direction thereof.

In the microcomputer 26, an integration vector is evaluated on the basis of the whole motion vector. The integration vector represents a deviation amount of an extracting area 82 from a center of the image field 80, i.e., a correction amount and a direction thereof.

The integration vector thus evaluated is applied to the memory control circuit 20 in which a start address for reading the field memory 22 is determined on the basis of the integration vector, and therefore, the digital video signal stored in the field memory 22 is read-out. That is, the memory control circuit 20 moves the extracting area 82 formed by the digital video signal of the field memory 22 according to the integration vector calculated by the microcomputer 26.

In addition, since the extracting area 82 can not be moved by the digital video signal read from the field memory 22 as it is, an electronic zooming circuit 84 is utilized.

Figure 12:
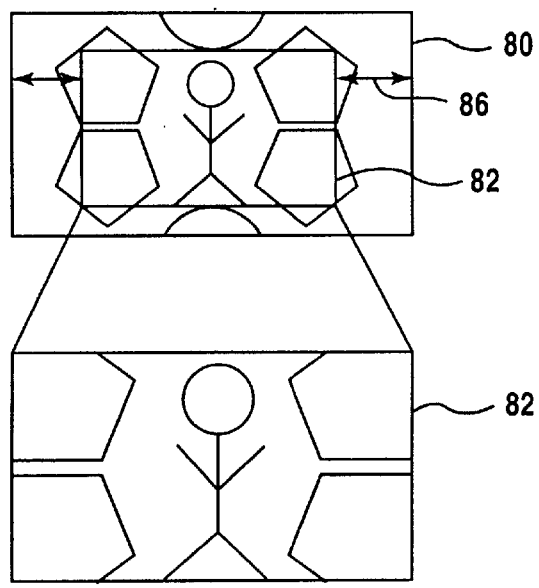
FIG. 12 is an illustrative view showing a principle of an electronic picture stabilization.

With referring to FIG. 12, the electronic zooming circuit 84 (FIG. 1) sets the extracting area 82 in which an image is enlarged according to a zooming multiplication with respect to a size of the image field 80. The position of the extracting area 82 can be freely moved within the image field 80 by changing the start address for reading the field memory 22. Then, in order to obtain a video signal of a whole of the image field 80 on the basis of the digital video signal, the image is enlarged with utilizing the interpolation based upon the digital video signal read from the field memory 22.

Thus, by zooming-up the image in the extracting area 82 within the image field 80 in an electronic manner by the electronic zooming circuit 84, a correctable range 86 equal to a difference between the image field 80 and the extracting area 82 can be formed.

Figure 13:
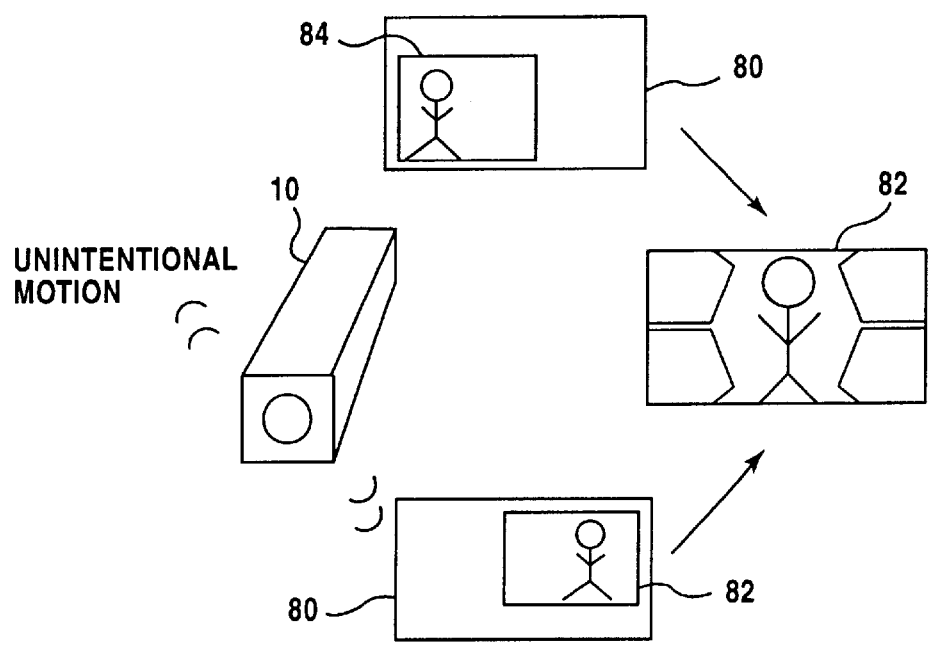
FIG. 13 is an illustrative view showing the detection areas within the image field, to which a representative point matching method is applied.

If the unintentional motion occurs in the video camera due to a vibration of hands of a person who operates the video camera 10 as shown in FIG. 13, the image from the video camera 10 is moved, and resultingly, there occurs a case where a target person exists at a left lower portion of the image field 80 (FIG. 13 upper) or a case where the target person exists at a right upper portion of the image field 80 (FIG. 13 lower). Therefore, by moving the extracting area 82 according to the integration vector calculated by the microcomputer 26 for each field, as shown at a right portion of FIG. 13, the target person becomes to just exist in the extracting area 82.

The digital video signal thus outputted from the electronic zooming circuit 84 is converted into an analog signal by a A/D converter 88, and the analog signal is outputted from an output end 90 as a corrected image signal.

Figure 14:
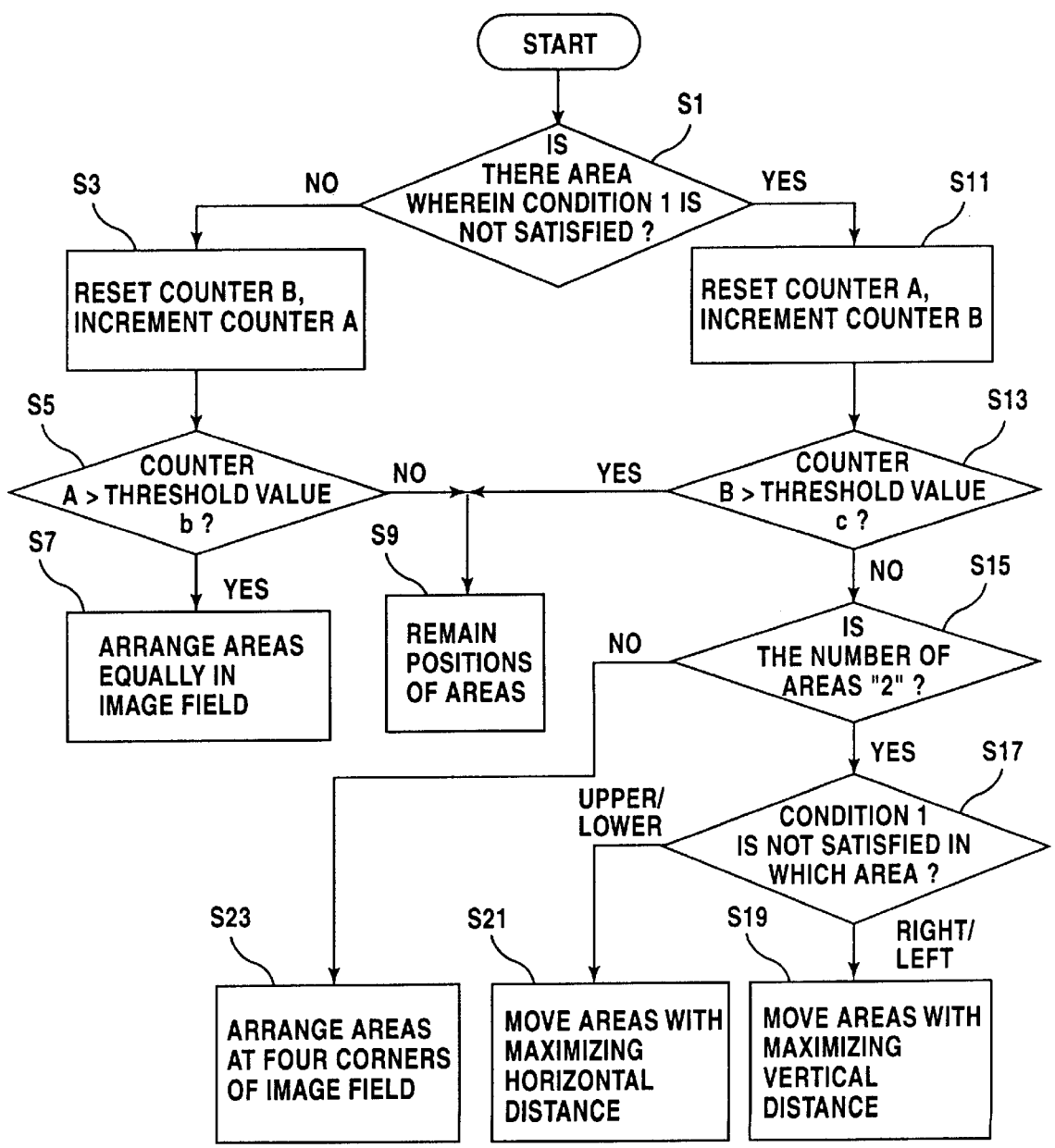
FIG. 14 is a flowchart showing a major portion of an operation of the embodiment.

FIG. 14 shows an operation for moving the detection areas of the video camera 10.

First, in a step S1 shown in FIG. 14, it is determined whether or not there is a detection area wherein the condition (1) of (mean correlation value)/(minimum correlative value) >threshold value (a), out of the four (4) detection areas A to D. If "NO", that is, if all the detection areas A to D satisfy the condition (1), the process proceeds to a step S3.

In the step S3, the B counter is reset, and the A counter is incremented. Then, in a step S5, it is determined whether or not a condition that the A counter is larger than a threshold value (b) ("60", for example). If "YES", in a step S7, the detection areas A to D are arranged with equal intervals in the screen, i.e. the image field 80 at the initial positions thereof. If "NO" is determined in the step S5, in a step S9, the positions of the detection areas A to D are not changed.

On the other hand, if "YES" is determined in the step S1, that is, if there is a detection area wherein the condition (1) is not satisfied, the process proceeds to a step S11 in which the A counter is reset and the B counter is incremented. Next, in a step S13, it is determined whether or not a condition that the B counter is larger than a threshold value c ("60", for example). If "YES" is determined in he step S9, the positions of the detection areas A to D are not moved.

If "NO" is determined in the step S13, in a step S15, the number of the detection areas in each of which the condition (1) is not satisfied is counted. If the number of the detection areas is "2", the process proceeds to a step S17.

In step S17, it is determined which two detection areas do not satisfy the condition (1). When the two detection areas are left two detection areas or right two detection areas, in a step S19, the detection areas A to D are moved such that a distance between the detection areas adjacent in a vertical direction becomes maximum. On the other hand, if the two detection areas are upper two detection areas or lower two detection areas, in a step S21, the detection areas A to D are moved in a manner that a distance between the detection area adjacent in a horizontal direction becomes maximum.

On the other hand, if it is determined that the number of the detection areas in each of which the condition (1) is not satisfied is other than "2" in the step S15, in a step S23, the detection area A to D are arranged at four (4) corners of the screen, i.e. the image field 80, so that the distance between the detection areas adjacent in the vertical direction becomes maximum and the distance between the detection areas adjacent in the horizontal direction also becomes maximum.

Figure 15:
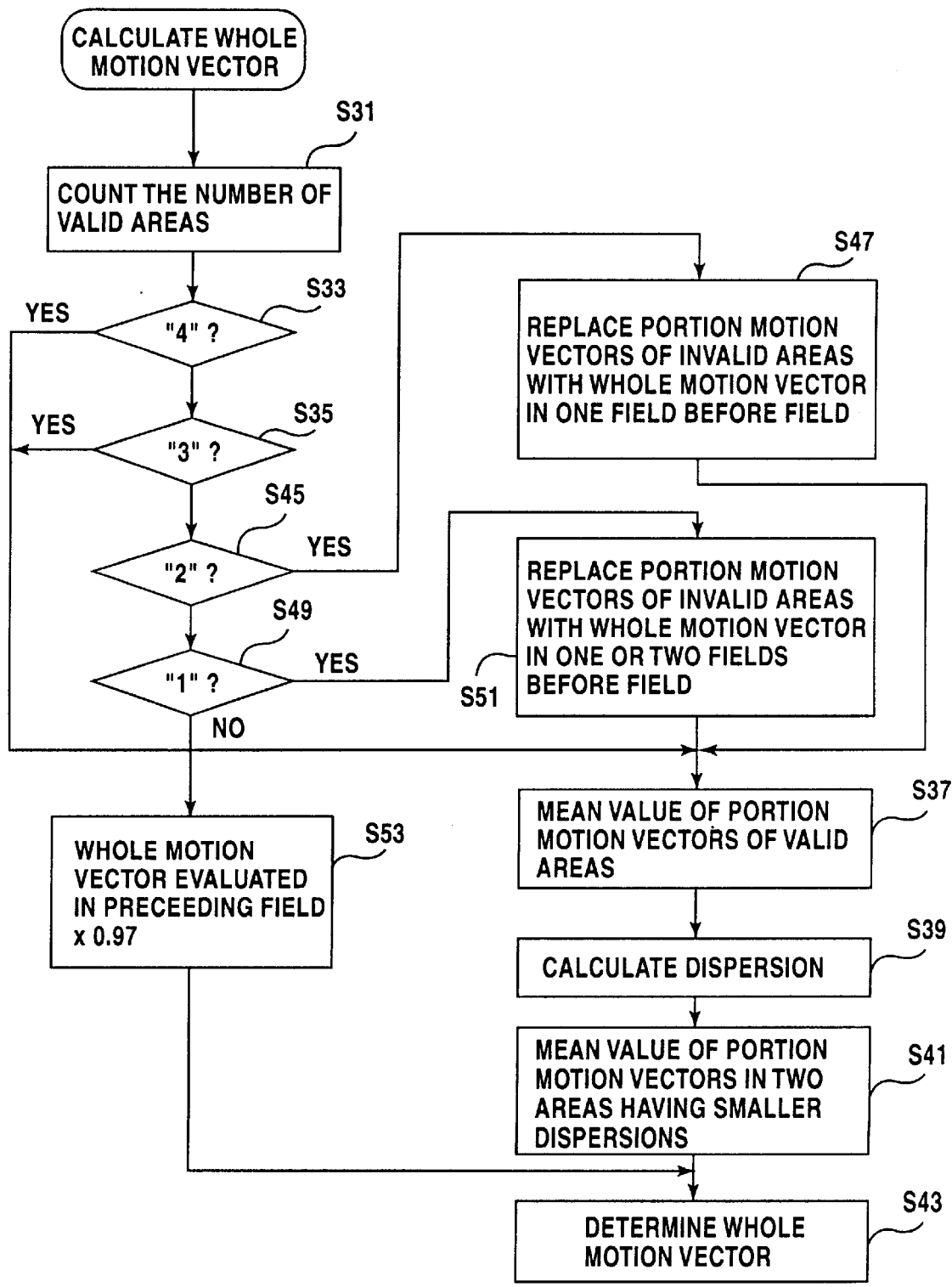
FIG. 15 is a flowchart showing one example of an operation for calculating a whole motion vector.

Thereafter, the whole motion vector is calculated in accordance with the number of the valid detection areas as shown in FIG. 15.

First, in a step S31 shown in FIG. 15, the number of the valid detection areas is counted. In a step S33, it is determined whether or not the number of the valid detection areas is "4", and if "NO", in a step S35, it is determined whether or not the number of the valid detection areas is "3". If "YES" is determined in the step S33 or S35, the process proceeds to a step S37. That is, if the number of the valid detection areas is equal to or larger than "3", in the step S37, mean values in the horizontal direction and the vertical direction of the portion motion vectors are evaluated for the valid detection areas. Then, in a step S39, with utilizing the means values evaluated in the step S37, an absolute value of the horizontal direction and an absolute value of the vertical direction are evaluated for each of the detection areas, and a dispersion is obtained by adding the absolute value of the horizontal direction and the absolute value of the vertical direction to each other for each of the detection areas. The absolute value of the horizontal direction is an absolute value of a difference between the portion motion vector of the horizontal direction and the mean value of the portion motion vectors in the horizontal direction of the valid detection areas. Furthermore, the absolute value of the vertical direction is an absolute value of a difference between the portion motion vector of the vertical direction and the mean value of the portion motion vectors in the vertical direction of the valid detection areas. Then, four (4) dispersions are arranged according to values thereof, and two (2) smaller dispersion are selected, and then, a mean value of the portion motion vectors of the detection areas corresponding to the two smaller dispersions is evaluated. Thereafter, in a step S43, the mean value is made as the whole motion vector.

On the other hand, if the number of the valid detection areas is not "3" in the step S35, in a step S45, it is determined whether or not the number of the valid detection areas is "2".

If "YES" is determined, in a step S47, the portion motion vector of an arbitrary invalid detection area is replaced with the whole motion vector evaluated one (1) field before, and thereafter, the process proceeds to the step S37. Through the steps S37 to S43, the whole motion vector is determined. In this embodiment shown, one of the portion motion vectors of two (2) invalid detection areas is replaced with the whole motion vector, and the other of the portion motion vector of the two (2) invalid detection areas is not compensated. Therefore, in such a case, the whole motion vector is determined on the basis of the portion motion vectors of the two (2) valid detection areas and the portion motion vector of the invalid detection area that is replaced with the whole motion vector.

If it is determined that the number of the valid detection areas is not "2" in the step S45, in a step S49, it is determined whether or not the number of the valid detection areas is "1".

If "YES" is determined, in a step S51, the portion motion vectors of arbitrary invalid detection areas are replaced with the whole motion vector evaluated one (1) field before and the whole motion vector evaluated two (2) fields before, and then, the process proceeds to the step S37. Through the steps S37 to S43, the whole motion vector is determined. In this embodiment shown, the portion motion vectors of two (2) invalid detection areas out-of three (3) invalid detection areas are replaced with the whole motion vector evaluated one (1) field before and the whole motion vector evaluated two (2) fields before, respectively, and the portion motion vector of a remaining invalid detection area is not compensated. Therefore, in such a case, the whole motion vector is determined on the basis of the portion motion vector of one valid detection area and portion motion vectors being replaced with the whole motion vector of the two invalid detection areas.

If the number of the valid detection areas is not "1" in the step S49, that is, if it is determined that all the detection areas are the invalid detection areas, in a step S53, the whole motion vector evaluated one (1) field before is multiplied by a constant of "0.97", for example, and a multiplication result is determined as the whole motion vector in a step S43.

In addition, the number of the dispersions selected in the step S13 may be "1" or other arbitrary value.

Furthermore, a coefficient or constant multiplied to the whole motion vector evaluated one field before is not limited to "0.97", and the coefficient may be an arbitrary value that is larger than zero and smaller than "1".

Next, with referring to FIG. 16, the above described embodiment will be described more specifically.

Figure 16A:
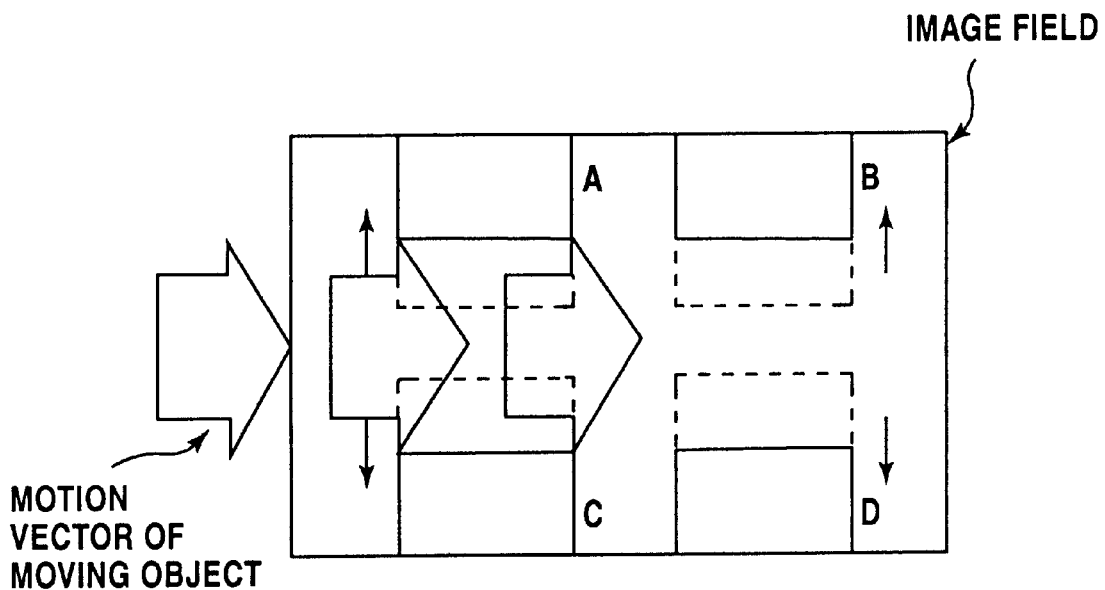
FIG. 16 is an illustrative view showing a state where the detection areas are moved in response to entrance of a moving object so as to prevent the whole motion vector from being erroneously detected.
Figure 16B:
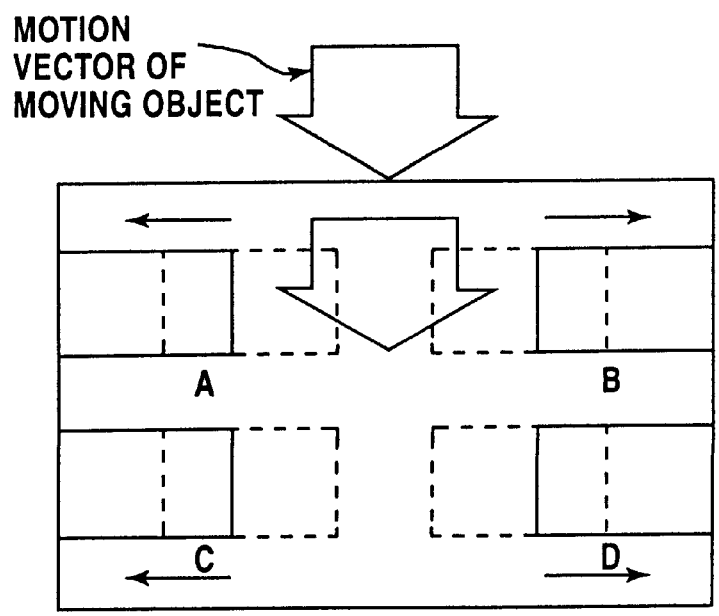
Figure 17:
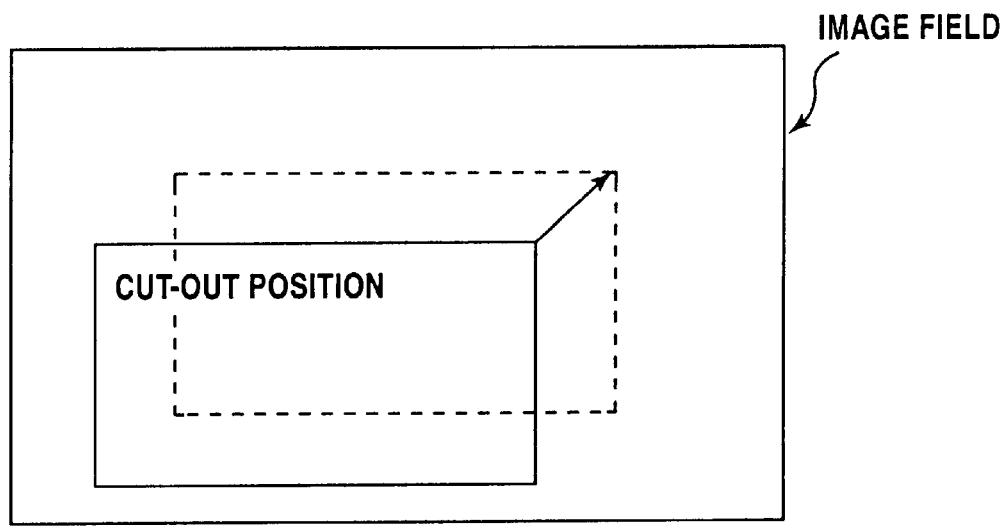
FIG. 17 is an illustrative view showing movement of a cut-out position of an image.
Figure 18:
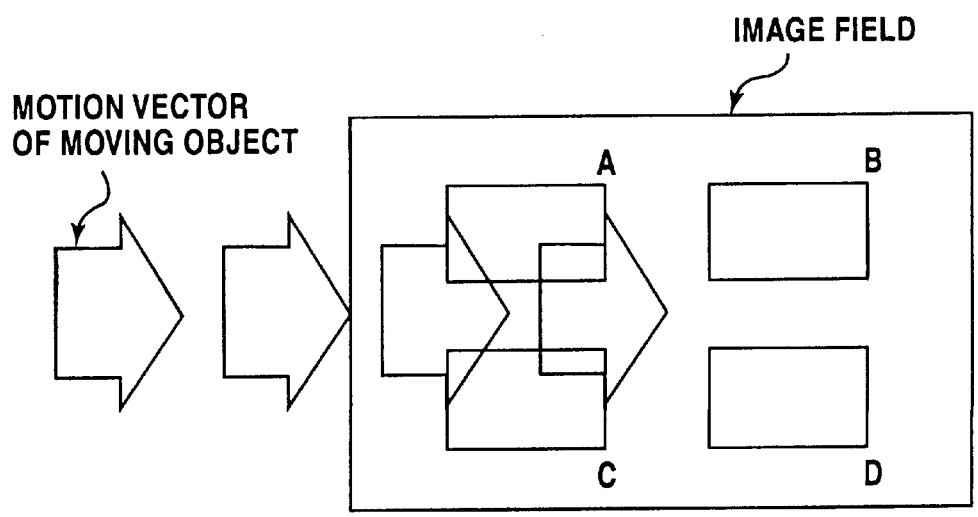
FIG. 18 is an illustrative view showing a state where a moving object enters into the detection areas from a left side.

For example, as shown in FIG. 16(A), if the moving object enters into the image field 80 from the left side (horizontal direction), the detection areas A to D are moved upward and downward such that the distance between the detection areas adjacent in the vertical direction becomes maximum. Furthermore, as shown in FIG. 16(B), if the moving object enters into the image field 80 from an upper side (vertical direction), the detection areas A to D are moved leftward and rightward, so that the distance between the detection areas adjacent in the horizontal direction becomes maximum.

Furthermore, if the number of the invalid detection areas is other than "2", it is possible to prevent the number of the valid detection areas from being decreased by moving the detection areas A to D to the four (4) corners of the image field 80 in spite of a size or shape of the moving object.

In accordance with this embodiment shown, in a case where a detection area wherein the condition (1) is not satisfied is continuously detected for sixty (60) fields, for example, by moving the detection areas A to D so as to make the distance between the adjacent detection areas maximum, the invalid area is changed to the valid area, and therefore, it is possible to prevent the number of the valid detection areas from being decreased. Therefore, in evaluating the whole motion vector through an operation shown in FIG. 15, the whole motion vector can be effectively detected with utilizing the portion motion vectors of the valid detection area, and therefore, the reliability that the whole motion vector is due to the unintentional motion of the video camera becomes higher, and resultingly, the electronic picture stabilization can be performed with more accuracy.

Furthermore, if the condition (1) is continuously satisfied for sixty (60) fields, for example, the detection areas A to D are returned to their initial positions shown in FIG. 3 or FIG. 6 to perform the picture stabilization.

Furthermore, the valid detection area may be determined by detecting whether or not the mean correlation value is equal to or larger than a predetermined value for each of the detection areas A to D. That is, the valid detection area may be determined on the basis of only a condition concerning with the mean correlation value. Furthermore, the valid detection area may be determined by two conditions of the above described (mean correlation value)/(minimum correlation value) and the mean correlation value.

More specifically, when a contrast of the screen is low, the luminance difference is small, and therefore, the correlation value becomes small. For example, a whole screen is white, the correlation value becomes small. In such a case, the reliability becomes low, and therefore, if the condition of (the mean correlation value)≧(the predetermined value) is satisfied, the detection area is determined as the valid detection area. In addition, the predetermined value may be determined through tests.

Furthermore, one example of each of the register setting values is shown in the table 1; however, such the register setting values may be set arbitrarily.

Furthermore, in the above described embodiment, four detection areas are set within the image field; however, detection areas more than five (5) may be set.

Furthermore, in the above described embodiment, the processing is performed field by field; however, the process may be performed frame by frame. Therefore, in this specification, for convenience, a term "field" is utilized to include a case of the field by field processing and the frame by frame processing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic picture stabilizer, comprising:
   a means for detecting a portion motion vector for each of a plurality of detection areas arranged within an image field;
   a means for evaluating a whole motion vector on the basis of the portion motion vectors of the detection areas; and
   a relative position changing means for moving at least one predetermined detection area out of a plurality of detection areas with respect to remaining detection areas so as to change relative positions between the plurality of detection areas.

2. An electronic picture stabilizer according to claim 1, further comprising an area determination means for determining whether each of the detection areas is a valid area or invalid area, wherein
   when it is determined by said area determination means that there is an invalid detection, the detection areas are moved by said relative position changing means in a predetermined manner.

3. An electronic picture stabilizer according to claim 2, wherein the detection areas are moved by said moving means in manners different from each other in accordance with a position of said invalid detection area.

4. An electronic picture stabilizer according to claim 3, wherein the detection areas are moved by said moving means in a manner that a distance between the detection areas adjacent in a vertical direction becomes maximum at a time that it is determined by said area determination means that the detection areas adjacent in the vertical direction are invalid areas.

5. An electronic picture stabilizer according to claim 3 or 4, wherein the detection areas are moved by said moving means in a manner that a distance between the detection areas adjacent in a horizontal direction becomes maximum at a time that it is determined by said area determination means that the detection areas adjacent in the vertical direction are invalid areas.

6. An electronic picture stabilizer according to one of claims 3 or 4, further comprising a counting means for counting the number of the invalid detection areas, wherein
the detection areas are moved by said moving means in manners different from each other in accordance with the number of the invalid detection areas.

7. An electronic picture stabilizer according to claim 6, wherein the detection areas are moved by said moving means in a manner that a distance between the detection areas adjacent in a horizontal direction becomes maximum and a distance between the detection areas adjacent in a vertical direction becomes maximum at a time that it is determined by said counting means that the number of the invalid detection areas is other than a predetermined value.

8. An electronic picture stabilizer according to one of claims 2 to 4, further comprising a means for returning the detection areas back to their initial positions at a time that all the detection areas become valid detection areas.

9. An electronic picture stabilizer according to claim 8, wherein the detection areas are returned-back to the initial positions at a time that all the detection areas are continuously become valid detection areas during a predetermined number of fields.

10. A video camera, comprising:
a means for detecting a portion motion vector for each of a plurality of detection areas arranged within an image field;
a means for evaluating a whole motion vector on the basis of the portion motion vectors of the detection areas;
a means for correcting an intentional motion of said video camera on the basis of the whole motion vector; and
a relative position changing means for moving at least one predetermined detection area out of a plurality of detection areas with respect to remaining detection areas so as to change relative positions between the plurality of detection areas.

11. A video camera according to claim 10, further comprising an area determination means for determining whether each of the detection area is a valid area or invalid area, wherein
when it is determined by said area determination means that there is an invalid detection, the detection areas are moved by said relative position changing means in a predetermined manner.

12. A video camera according to claim 11, wherein the detection areas are moved by said moving means in manners different from each other in accordance with a position of said invalid detection area.

13. A video camera according to one of claims 10 to 12, further comprising a counting means for counting the number of the invalid detection areas, wherein
the detection areas are moved by said moving means in manners different from each other in accordance with the number of the invalid detection areas.

14. An electronic picture stabilizer according to claim 5, further comprising a counting means for counting the number of the invalid detection areas, wherein
the detection areas are moved by said moving means in manners different from each other in accordance with the number of the invalid detection areas.

15. An electronic picture stabilizer according to claim 5, further comprising a means for returning the detection areas back to their initial positions at a time that all the detection areas become valid detection areas.

16. An electronic picture stabilizer according to claim 6, further comprising a means for returning the detection areas back to their initial positions at a time that all the detection areas become valid detection areas.

17. An electronic picture stabilizer according to claim 7, further comprising a means for returning the detection areas back to their initial positions at a time that all the detection areas become valid detection areas.

18. An electronic picture stabilizer according to claim 15, wherein the detection areas are returned-back to the initial positions at a time that all the detection areas are continuously become valid detection areas during a predetermined number of fields.

19. An electronic picture stabilizer according to claim 16, wherein the detection areas are returned-back to the initial positions at a time that all the detection areas are continuously become valid detection areas during a predetermined number of fields.

20. An electronic picture stabilizer according to claim 17, wherein the detection areas are returned-back to the initial positions at a time that all the detection areas are continuously become valid detection areas during a predetermined number of fields.

21. A video camera comprising:
an image sensor, having an optical signal as an input signal and a converted electrical signal as an output; and
a camera circuit,
wherein said camera circuit comprises:
a sample and hold circuit having an input of said converted electrical signal, and having an output of held samples of said converted electrical signals;
an analog to digital converter having an input of said held samples and having an output of digital values of said held samples;
a motion detecting circuit having an input of said digital values and having an output of correlation data associated with at least two detection areas of said image sensor; and
a microcomputer having an input of said correlation data, and having a first output to said motion detecting circuit,
wherein said motion detecting circuit is responsive to said first output of said microcomputer to move at least one detection area of said at least two detection areas so as to change relative positions between the at least two detection areas to perform picture stabilization.

22. An electronic picture stabilizing method, comprising the steps of:
(a) detecting a portion motion vector for each of a plurality of detection areas arranged within an image field;

(b) evaluating a whole motion vector on the basis of the portion motion vectors detected in step (a); and (c) moving at least one predetermined detection area of said plurality of detection areas with respect to remaining detection areas so as to change relative positions between the plurality of detection areas.

23. An electronic picture stabilizing method, comprising the steps of:

(a) detecting a portion motion vector for each of a plurality of detection areas arranged within an image field;

(b) evaluating a whole motion vector on the basis of the portion motion vectors of the detection areas detected in step (a);

(c) correcting a motion of a video camera on the basis of the whole motion vector evaluated in step (b); and (d) moving at least one predetermined detection area out of the plurality of detection areas with respect to remaining detection areas so as to change relative positions between the plurality of detection areas.

* * * * *